(12) United States Patent
Schaffer

(10) Patent No.: US 8,670,027 B1
(45) Date of Patent: Mar. 11, 2014

(54) MODIFIED SCANNER PEN

(76) Inventor: Matthew E. Schaffer, Seminole, FL (US)

( * ) Notice: Subject to any disclaimer, the term of this patent is extended or adjusted under 35 U.S.C. 154(b) by 431 days.

(21) Appl. No.: 13/070,928

(22) Filed: Mar. 24, 2011

(51) Int. Cl.
*H04N 7/18* (2006.01)
(52) U.S. Cl.
USPC ............................................. 348/61
(58) Field of Classification Search
USPC ............................... 375/61; 348/61
See application file for complete search history.

(56) References Cited

U.S. PATENT DOCUMENTS

| | | | |
|---|---|---|---|
| 5,142,161 A | 8/1992 | Brackmann | |
| 6,791,720 B1 | 9/2004 | Hsieh | |
| 7,164,811 B2 | 1/2007 | Nathanson et al. | |
| D617,797 S | 6/2010 | Moon et al. | |
| 8,228,299 B1 * | 7/2012 | Maloney et al. | 345/173 |
| 2002/0163511 A1 | 11/2002 | Sekendur | |
| 2004/0252350 A1 * | 12/2004 | Hsieh | 358/471 |
| 2005/0125228 A1 | 6/2005 | Samuels | |
| 2007/0176909 A1 * | 8/2007 | Pavlowski | 345/179 |

* cited by examiner

*Primary Examiner* — Dave Czekaj
*Assistant Examiner* — Tracy Li

(57) ABSTRACT

A modified scanner pen comprising a microprocessor; a scanner with an on/off button, an audio recorder with an on/off button, an audio speaker, a video camera recorder with an on/off button; a secure digital (SD) slot; and a universal serial bus (USB) slot which stores date which can be reviewed.

2 Claims, 5 Drawing Sheets

(ISO View)

(Side View)

(Front View)

(Back View)

(Alternative Embodiment)

(In-use View)

MODIFIED SCANNER PEN

BACKGROUND OF THE INVENTION

The present invention is directed to a modified scanner pen. The modified scanner pen of the present invention provides an easier and more efficient way of taking notes during a class or meeting.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
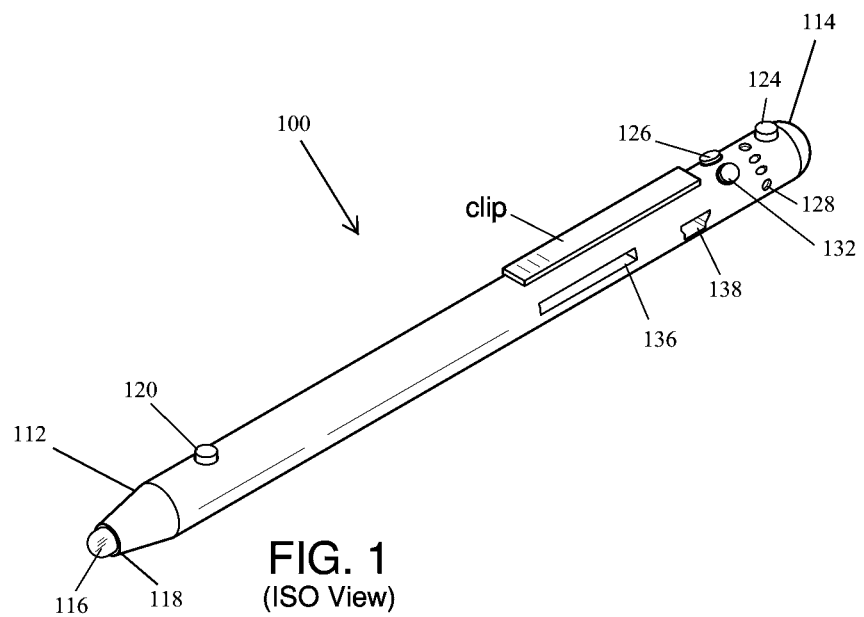
FIG. 1 shows a perspective view of a modified scanner pen.
Figure 2:
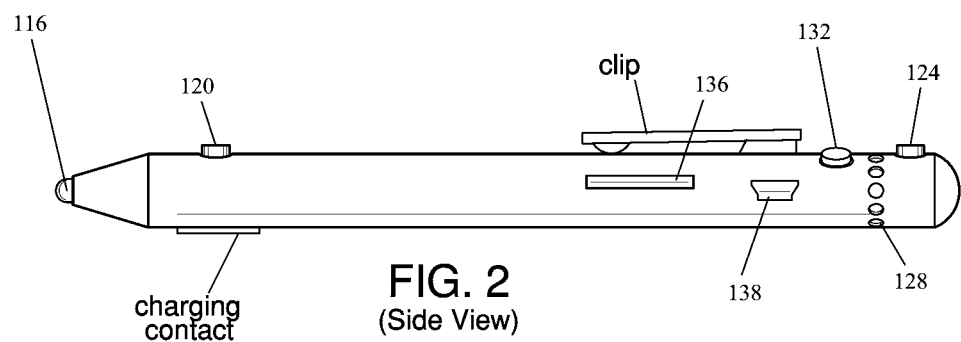
FIG. 2 shows a side view of a modified scanner pen.
Figure 3:
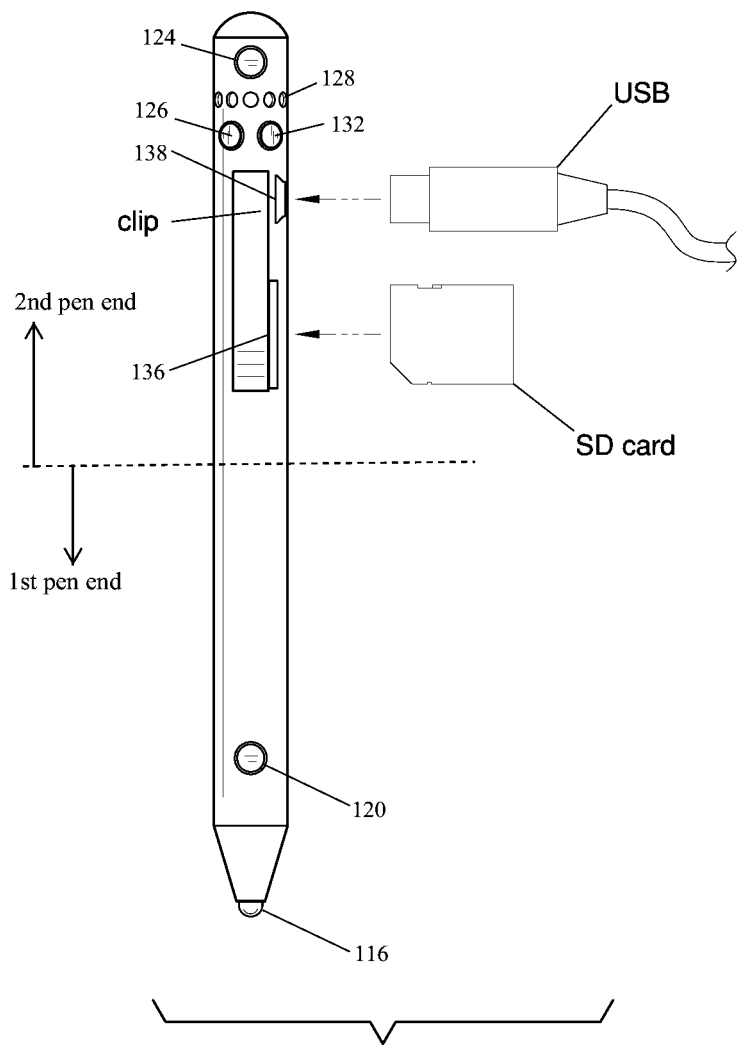
FIG. 3 shows a front view of a modified scanner pen.
Figure 4:
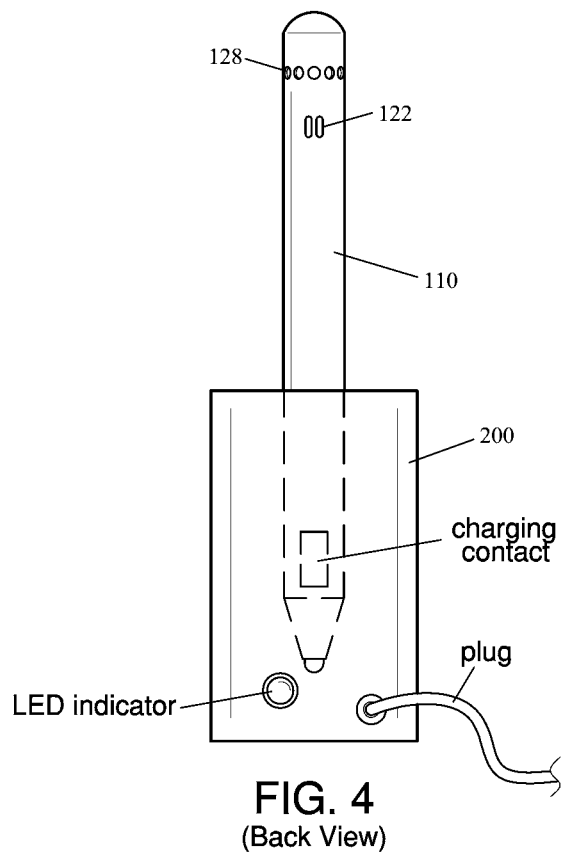
FIG. 4 shows a back view of a modified scanner pen.
Figure 5:
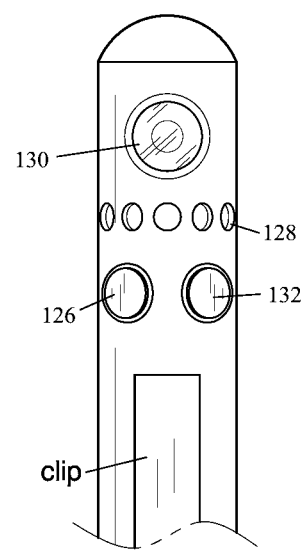
FIG. 5 shows an alternative view of a modified scanner pen.
Figure 6:
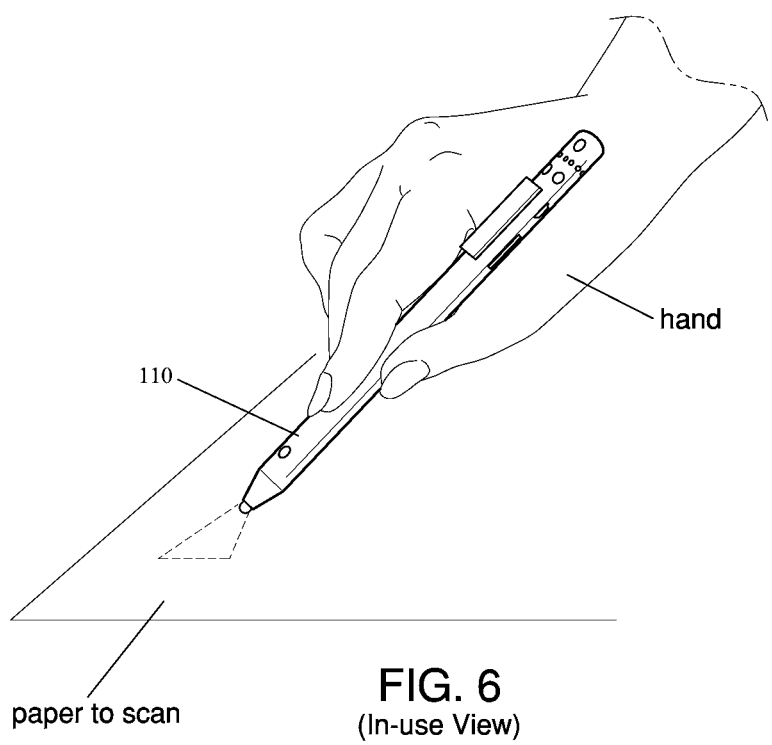
FIG. 6 shows another perspective view of a modified scanner pen in use.
Figure 7:
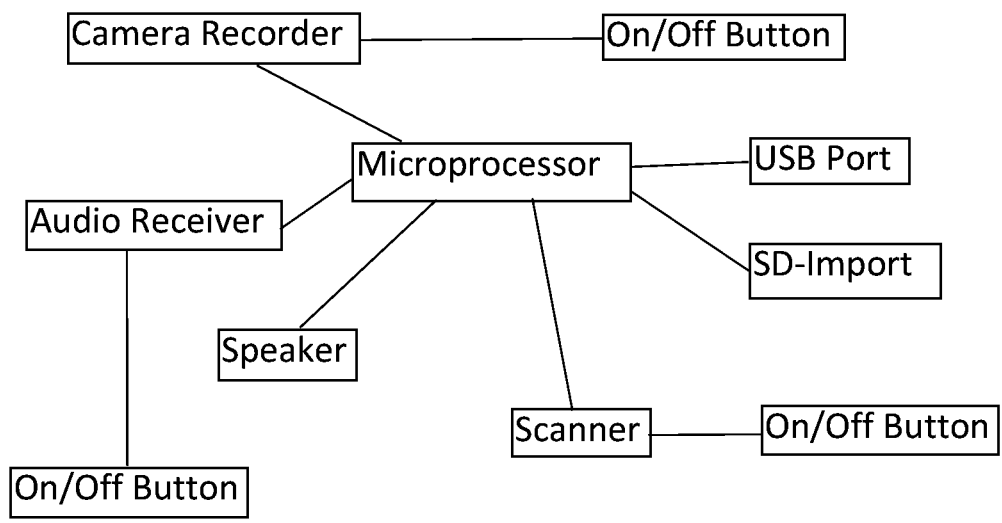
FIG. 7 shows a diagram of the components of a modified scanner pen.

Referring now to FIG. 1-7, the present invention features a modified scanner pen 100 comprising a microprocessor 110. The pen further comprises a first pen end 112 and a second pen end 114. A scanner 116 is disposed at a tip 118 of the first pen end which is operably connected to the microprocessor. A scanner on/off button 120 is disposed at the second pen end which is operatively connected to the scanner to turn the scanner on or off. The scan feature of this pen allows a user to scan information from documents such as books or magazines that they can review at a later time.

The pen further comprises an audio recorder 122 disposed at the second pen end, which is operably connected to the microprocessor. An audio recorder on/off button 124 is disposed at the second pen end which is operably connected to the audio recorder to turn the audio recorder on or off. The pen further comprises an audio play back button 126 which is operably connected to the microprocessor. An audio speaker 128 disposed at the second pen end, which is operably connected to the microprocessor. The audio recorder feature could be used during lectures or meetings to allow a user to go over the data multiple times at a later time or to record notes rather than to have to handwrite them.

The pen further comprises a video camera recorder 130 disposed at the second pen end which is operably connected to the microprocessor. A video camera recorder on/off button 132 is disposed at the second pen end which is operably connected to the video camera recorder to turn the video camera recorder on or off. This feature would be beneficial to record things such as demonstrations that can be reviewed or studied more thoroughly.

The pen further comprises a secure digital (SD) slot 136 disposed at the second pen end, which is operably connected to the microprocessor. The pen further comprises a universal serial bus (USB) slot 138, which is operably connected to the microprocessor.

The microprocessor is configured to receive a scanned data from the scanner when the scanner is turned on. The microprocessor stores the scanned data, the scanned data can be exported to a first external device by operably connecting the first external device with the modified pen via the USB slot.

The microprocessor is configured to receive a video data from the video camera recorder when the video camera recorder is turned on. The microprocessor stores the video data, wherein the video data can be exported to an SD card by operably connecting the SD card with the modified pen via the SD slot.

The microprocessor is configured to receive an audio data from the scanner when the audio recorder is turned on. The microprocessor stores the audio data.

The microprocessor is configured to receive an audio playback instruction from the audio play back button when the audio play back button is activated. Upon receiving the audio playback instruction the microprocessor sends a playback signal to the speaker to play back the stored audio data.

The microprocessor is configured to a power source 200 which is operably connected to components listed above. The power source is rechargeable. The modified scanner pen further comprises a charging contact disposed at the first pen end, which is operably connected to the rechargeable power source.

By way of example, wand type scanners, such as the DataSweep® PencilWand manufactured by SORICON Corporation of Boulder, Colo., are suited for use in the present invention. Other scanners systems that may be used in accordance with the present invention have been disclosed in patents such as U.S. Pat. No. 5,142,161 to Brackmann, and U.S. Pat. No. 6,791,720 TO Hsieh, the disclosures of which are incorporated herein by reference.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

The modified scanner pen would be ideal for people such as students or businessmen/women in such that it is a more effective way of taking notes during classes or meetings and researching information by utilizing any of the above features.

What is claimed is:
1. A modified scanner pen 100 comprising:
   (a) a microprocessor 110;
   (b) a first pen end 112 and a second pen end 114;
   (c) a scanner 116 disposed at a tip 118 of the first pen end, the scanner is operably connected to the microprocessor;
   (d) a scanner on/off button 120 disposed at the first pen end, the scanner on/off button is operatively connected to the scanner to turn the scanner on or off;
   (e) an audio recorder 122 disposed at the second pen end, the audio recorder is operably connected to the microprocessor;

(f) an audio recorder on/off button 124 disposed at the second pen end, the audio recorder button is operably connected to the audio recorder to turn the audio recorder on or off;
(g) an audio play back button 126 operably connected to the microprocessor;
(h) an audio speaker 128 disposed at the second pen end, the audio speaker operably connected to the microprocessor;
(i) a video camera recorder 130 disposed at the second pen end, the video camera recorder is operably connected to the microprocessor;
(j) a video camera recorder on/off button 132 disposed at the second pen end, the video camera recorder activator operably connected to the video camera recorder to turn the video camera recorder on or off;
(k) secure digital (SD) slot 136 disposed at the second pen end, the SD is operably connected to the microprocessor;
(l) universal serial bus (USB) slot 138, the USB is operably connected to the microprocessor;
(m) the microprocessor configured to:
   (i) receive a scanned data from the scanner when the scanner is turned on, the microprocessor stores the scanned data, the scanned data can be exported to a first external device by operably connecting the first external device with the modified pen via the USB slot;
   (ii) receive a video data from the video camera recorder when the video camera recorder is turned on, the microprocessor stores the video data, wherein the video data can be exported to an SD card by operably connecting the SD card with the modified pen via the SD slot;
   (iii) receive an audio data from the scanner when the audio recorder is turned on, the microprocessor stores the audio data; and
   (iv) receive an audio playback instruction from the audio play back button when the audio play back button is activated, wherein upon receiving the audio playback instruction the microprocessor sends a playback signal to the speaker to play back the stored audio data; and
(n) a power source 200 operably connected to components (c) through (n) listed above;
wherein the power source is rechargeable, a charging contact is disposed at the first pen end, wherein the charging contact operably connects to the rechargeable power source.

2. A modified scanner pen 100 consisting of:
(a) a microprocessor 110;
(b) a first pen end 112 and a second pen end 114;
(c) a scanner 116 disposed at a tip 118 of the first pen end, the scanner is operably connected to the microprocessor;
(d) a scanner on/off button 120 disposed at the first pen end, the scanner on/off button is operatively connected to the scanner to turn the scanner on or off;
(e) an audio recorder 122 disposed at the second pen end, the audio recorder is operably connected to the microprocessor;
(f) an audio recorder on/off button 124 disposed at the second pen end, the audio recorder button is operably connected to the audio recorder to turn the audio recorder on or off;
(g) an audio play back button 126 operably connected to the microprocessor;
(h) an audio speaker 128 disposed at the second pen end, the audio speaker operably connected to the microprocessor;
(i) a video camera recorder 130 disposed at the second pen end, the video camera recorder is operably connected to the microprocessor;
(j) a video camera recorder on/off button 132 disposed at the second pen end, the video camera recorder activator operably connected to the video camera recorder to turn the video camera recorder on or off;
(k) secure digital (SD) slot 136 disposed at the second pen end, the SD is operably connected to the microprocessor;
(l) universal serial bus (USB) slot 138, the USB is operably connected to the microprocessor;
(m) the microprocessor configured to:
   (i) receive a scanned data from the scanner when the scanner is turned on, the microprocessor stores the scanned data, the scanned data can be exported to a first external device by operably connecting the first external device with the modified pen via the USB slot;
   (ii) receive a video data from the video camera recorder when the video camera recorder is turned on, the microprocessor stores the video data, wherein the video data can be exported to an SD card by operably connecting the SD card with the modified pen via, the SD slot;
   (iii) receive an audio data from the scanner when the audio recorder is turned on, the microprocessor stores the audio data; and
   (iv) receive an audio playback instruction from the audio play back button when the audio play back button is activated, wherein upon receiving the audio playback instruction the microprocessor sends a playback signal to the speaker to play back the stored audio data; and
(n) a power source 200 operably connected to components (c) through (n) listed above;
wherein the power source is rechargeable, a charging contact is disposed at the first pen end, wherein the charging contact operably connects to the rechargeable power source.

\* \* \* \* \*